Dec. 14, 1948.  H. R. WHEELER ET AL  2,455,962
RECORDING LIQUID DISPENSER
Filed July 25, 1946
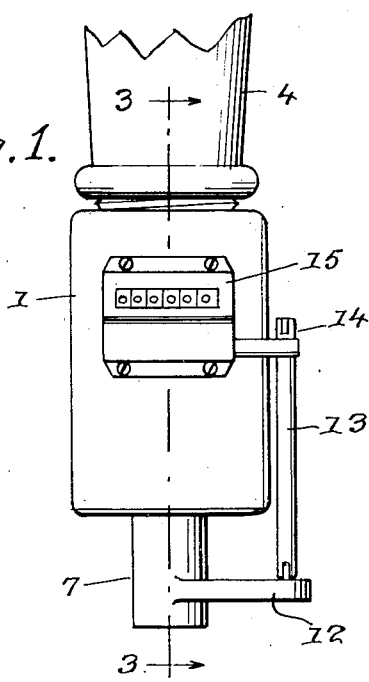
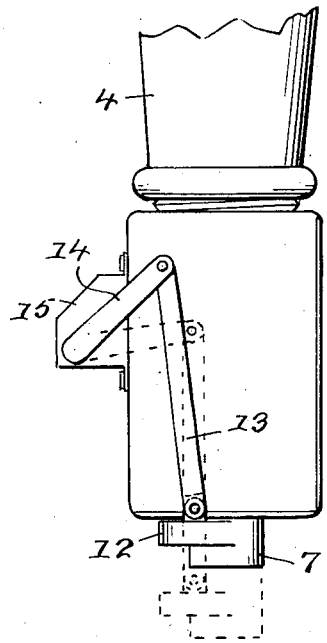
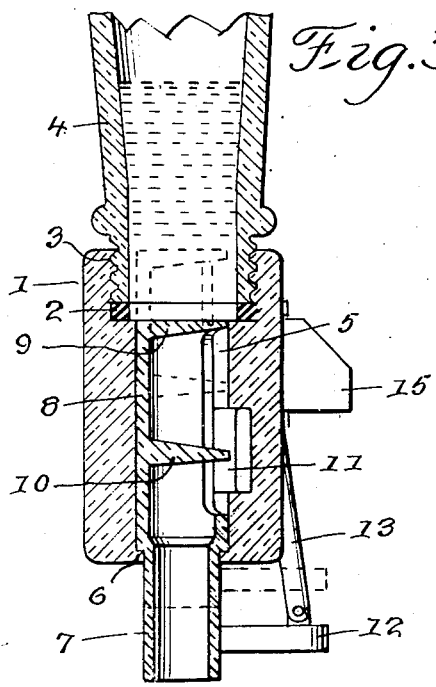
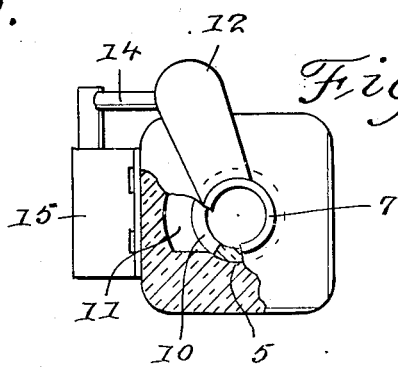
Harold R. Wheeler
Joseph A. Kofalt
INVENTOR.
BY Victor J. Evans & Co.
ATTORNEYS Patented Dec. 14, 1948

2,455,962

UNITED STATES PATENT OFFICE 2,455,962

RECORDING LIQUID DISPENSER

Harold R. Wheeler and Joseph A. Kofalt,
Harrisburg, Pa.

Application July 25, 1946, Serial No. 686,248

3 Claims. (Cl. 222—38)

1

This invention relates to improvements in liquid dispensing devices, and more particularly to the provision of a device for recording the amount of liquid dispensed.

Liquid dispensing devices heretofore employed have generally dispensed definite amounts of liquid at each operation, but such devices have had no means for determining the total amount of liquid dispensed over a given period. This is of importance in cafes, bars, and the like, which dispense many bottles of liquid daily.

It is, therefore, an object of this invention to provide a liquid dispensing device which records each predetermined quantity of liquid dispensed.

A further object is the provision of a liquid dispensing device having few parts, and simple operation, enabling accurate recording of the amount of liquid dispensed.

These and other objects are attained by the novel construction and arrangement of parts hereinafter described and illustrated by the accompanying drawings, forming a part hereof, and in which:

Fig. 1 is a front view of a recording liquid dispenser embodying the invention.

Fig. 2 is a side view of the device.

Fig. 3 is a sectional view taken on line 3—3 of Fig. 1.

Fig. 4 is a bottom view of the device.

Referring to the drawings, the recording liquid dispenser is shown to comprise a main body 1 having a shoulder upon which rests a washer 2 bearing against the mouth of a bottle 4 threaded in the body 1 at 3. The main body has a cylindrical hole 5 through which passes a tube 7, having an enlarged upper portion resting on a shoulder 6 of the main body 1.

The upper portion 8 of the tube has a pair of spaced baffles 9 and 10, and the main body 1 has a by-pass 11 communicating with the tube.

The lower end of the tube 7 is open, and fixed thereto is an arm 12, connected to a link 13, which is pivotally connected to an arm 14 adapted to operate a counter 15, mounted on the main body.

In operation, the upper baffle 9 normally closes the opening to the bottle containing the liquid. When it is desired to dispense a definite quantity of liquid the tube 7 is pushed up as far as it will go, thus moving baffle 9 up into the bottle, and allowing the liquid to flow in the space between baffle 9 and baffle 10. At the same time, the upward movement of cylinder 7 moves arm 12 and operates the counter 15 to record the dispensing of the quantity of liquid.

The cylinder is then allowed to move down, and the liquid is dispensed over baffle 10 into by-

2 pass 11, and through the lower part of cylinder 7 into a glass or other receiving container. When not in use, baffle 10 is normally positioned opposite the by-pass 11.

The device is simple in structure, having few parts, and positive in operation, with a minimum of leakage. The main body and parts associated therewith are preferably made of glass, the counter being of a common type and made of metal. The dispenser can be used advantageously in many situations such as liquor dispensing bars, cafes, laboratories, and other places where definite quantities of a liquid are required to be dispensed.

The above description is to be considered as illustrative and not limitative of the invention, of which modfications can be made without departing from the spirit and scope of the appended claims.

The invention having been described, what is claimed is:

1. In a measuring dispenser for bottles and the like, a cylindrical body having a centrally disposed bore extending longitudinally therethrough with an inner circumferential bead at the outer end, said body having a bypass recess communicating with the bore in one side thereof and intermediate of the ends of the body, and a tube providing a spout with a centrally disposed discharge passage and also providing a cylindrical base the outside diameter of which is greater than that of the circumferential bead, said tube being slidably mounted in the bore of the body, said cylindrical base being closed at the inner end and provided with a transverse baffle dividing the base into separated chambers, and said base having a longitudinally extending slot in one side communicating with each of the chambers thereof and also with the said bypass recess in the side of the bore of the body.

2. In a measuring dispenser for bottles and the like, a cylindrical body having a centrally disposed bore extending longitudinally therethrough with an inner circumferential bead at the outer end and an internally threaded socket at the inner end, and a tube providing a spout with a centrally disposed discharge passage and also providing a cylindrical base the outside diameter of which is greater than that of the circumferential bead, said tube being slidably mounted in the bore of the body, said cylindrical base being closed at the inner end and provided with a transverse baffle dividing it into separated chambers having openings therein at one side of the base, and said body having an internal recess adapted to communicate with said openings.

3. In a measuring dispenser for bottles and the like, a cylindrical body having a centrally disposed bore extending longitudinally therethrough with an inner circumferential bead at the outer end and an internally threaded socket at the inner end, said body having a bypass recess communicating with the bore in one side thereof and intermediate of the ends, and a tube providing a spout with a centrally disposed discharge passage and also providing a cylindrical base, the outside diameter of which is greater than that of the circumferential bead, said tube being slidably mounted in the bore of the body, said cylindrical base being closed at the inner end and provided with a transverse baffle intermediate of the ends dividing the base into separated chambers with the outer chamber communicating with the discharge passage, said base having a longitudinally extending slot in one side communicating with each of the chambers thereof and also adapted to communicate with the said bypass recess in the side of the bore of the body, and said tube having an actuating arm with a link pivotally connected thereto extending from one side thereof, said link adapted to actuate a counter positioned on the said body.

HAROLD R. WHEELER.
JOSEPH A. KOFALT.

REFERENCES CITED

The following references are of record in the file of this patent:

UNITED STATES PATENTS

| Number | Name | Date |
| --- | --- | --- |
| 416,435 | Benner | Dec. 3, 1889 |
| 603,983 | Boening | May 10, 1898 |
| 1,036,381 | Togna | Aug. 20, 1912 |
| 1,203,784 | Holmes | Dec. 19, 1916 |
| 2,135,168 | Cannon | Nov. 1, 1938 |
| 2,324,648 | Roeder | July 20, 1943 |
| 2,324,965 | Turner | July 20, 1943 |
| 2,363,747 | Reece et al. | Nov. 28, 1944 |

FOREIGN PATENTS

| Number | Country | Date |
| --- | --- | --- |
| 27,403 | Norway | Mar. 23, 1921 |
| 2,298/31 | Australia | Sept. 15, 1932 |